July 6, 1965 S. DAVIS 3,193,223
PARACHUTE RELEASE CONTROL

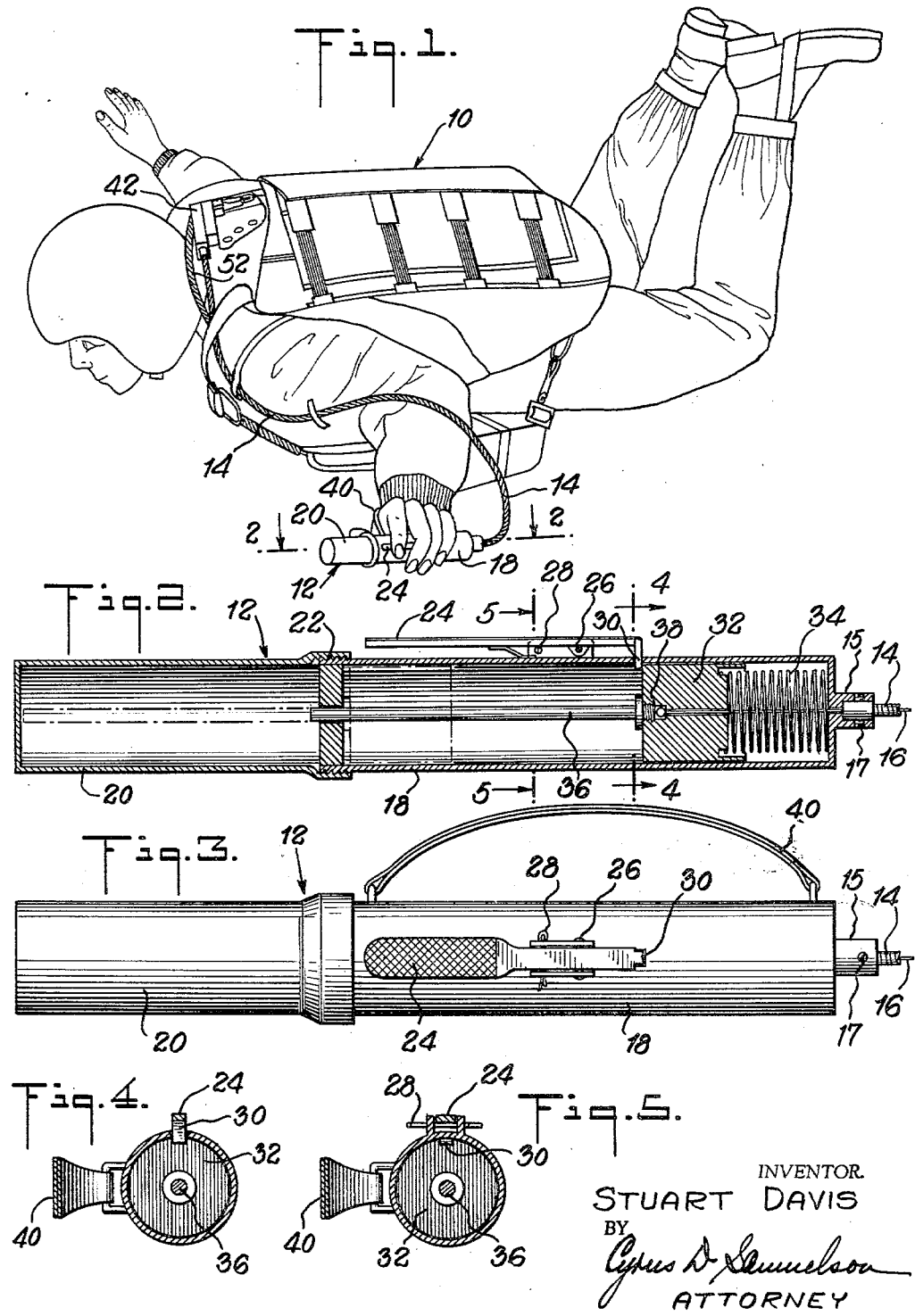

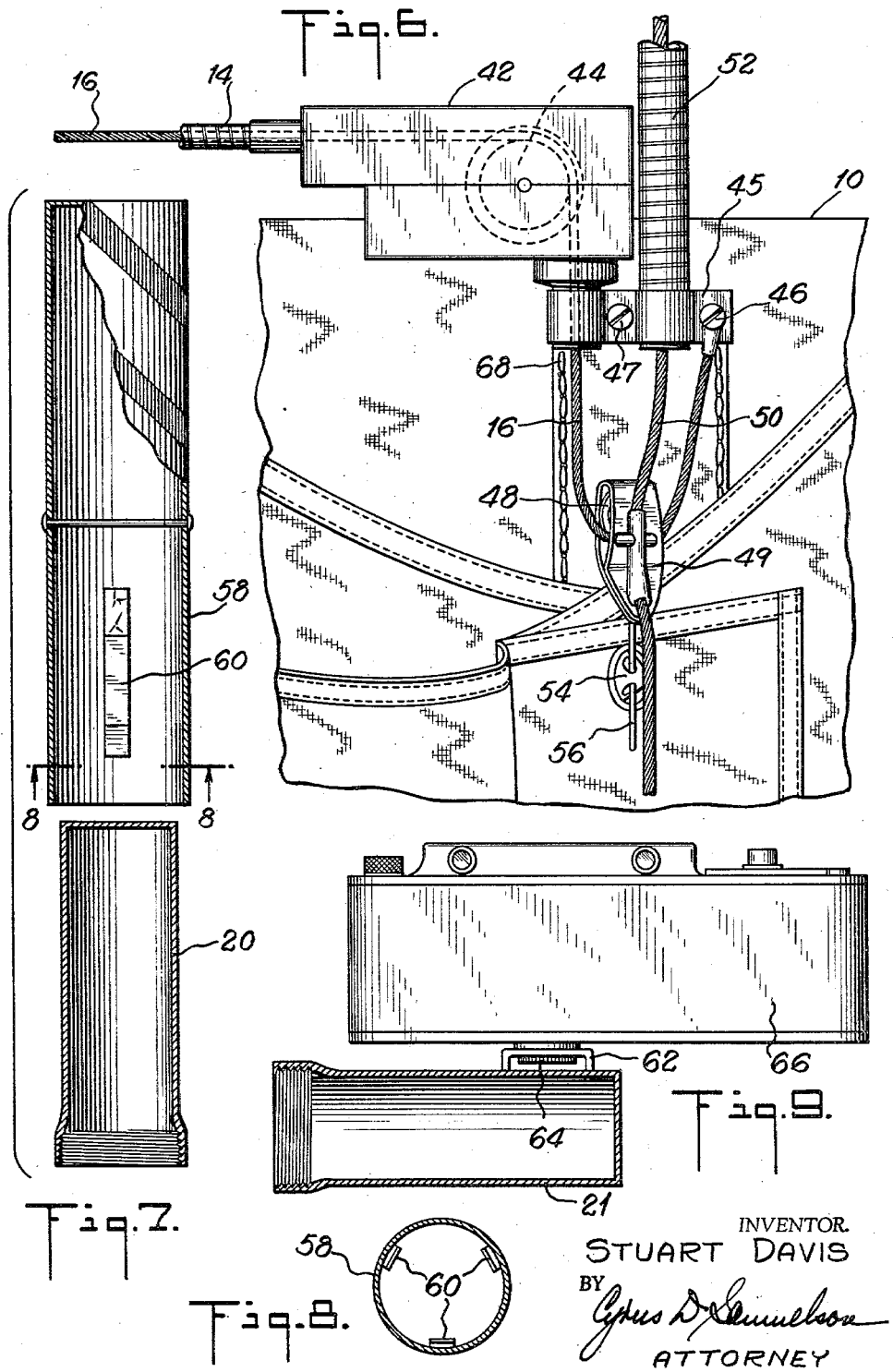

Filed July 31, 1963 3 Sheets-Sheet 3

INVENTOR.
STUART DAVIS
BY
*Cyrus D. Samuelson*
ATTORNEY

United States Patent Office 3,193,223
Patented July 6, 1965

3,193,223
PARACHUTE RELEASE CONTROL
Stuart Davis, 280 Clinton Place, Hackensack, N.J.
Filed July 31, 1963, Ser. No. 298,997
5 Claims. (Cl. 244—149)

The invention relates to parachute release controls and in particular to those parachute release controls whose actuator may be held in the hand during sky diving. The parachute release control of the invention is intended as an auxiliary to the usual D-ring rip cord release which is affixed to the front of the parachute harness.

In sky diving, the parachutist falls through the air face down, with arms and legs outstretched prior to opening the parachute. This spread-eagle attitude gives the jumper control over his descent and permits him to float downward in a stabilized position. Sky divers now use the usual D-ring rip cord release which is mounted on the left front of the harness. In order to release the parachute, the sky diver must reach across his body with his right hand, grasp the D-ring and pull the rip cord. This movement of the right arm from its outspread position to a position across the body disturbs the equilibrium of the jumper and often causes the body to tumble end over end. This tumbling can prevent the parachute from deploying properly, causing a serious malfunction of the parachute and thereby placing the jumper in jeopardy. Accordingly, it is an important object of the invention to provide a parachute release control which may be held in the left hand during sky diving prior to releasing the parachute from the hand, thereby allowing the jumper to maintain his equilibrium until his parachute is opened.

In some sky diving contests, the jumpers pass a baton in mid-air prior to opening their parachutes. It is a further object of the invention to provide a hand-held, parachute release control to which a baton may easily be attached and from which it may easily be removed.

It is a still further object of the invention to provide a hand-held parachute release control on which a camera may be mounted to facilitate the exposing of pictures during descent.

It is a still further object of the invention to provide such a parachute release control which is auxiliary and ancillary to the D-ring release mounted on the harness of the parachute pack.

It is a still further object of the invention to provide such a parachute release control which operates to release the pack by removing the locking pins from the cones.

It is a still further object of the invention to provide such a parachute release control which is simple to operate and positive in its action.

It is a still further object of the invention to provide such a parachute release control which is economical to produce.

These and other objects, advantages, features and uses will be apparent during the course of the following description when taken in conjunction with the accompanying drawings wherein:

FIGURE 1 is a perspective view showing a sky diver in spread-eagle position with the parachute release control of the invention held in his left hand;

FIGURE 2 is an enlarged, sectional view taken along the lines 2—2 of FIGURE 1, viewed in the direction of the arrows;

FIGURE 3 is a side elevational view of the parachute release control of the invention showing the positions of the hand strap and the actuating lever;

FIGURE 4 is a cross-sectional view taken along the lines 4—4 of FIGURE 2, viewed in the direction of the arrows;

FIGURE 5 is a cross-sectional view taken along the lines 5—5 of FIGURE 2, viewed in the direction of the arrows;

FIGURE 6 is a fragmentary, elevational view of the upper portion of a parachute pack showing the connection of the release cord of the invention with the upper locking pin and cone;

FIGURE 7 is an elevational view, partly broken away, of the baton removed from the dust cover of the parachute release control of the invention;

FIGURE 8 is a cross-sectional view along the lines 8—8 of FIGURE 7, viewed in the direction of the arrows;

FIGURE 9 is a sectional view of an alternative form of dust cover showing means for attaching a camera thereto;

Figure 10:
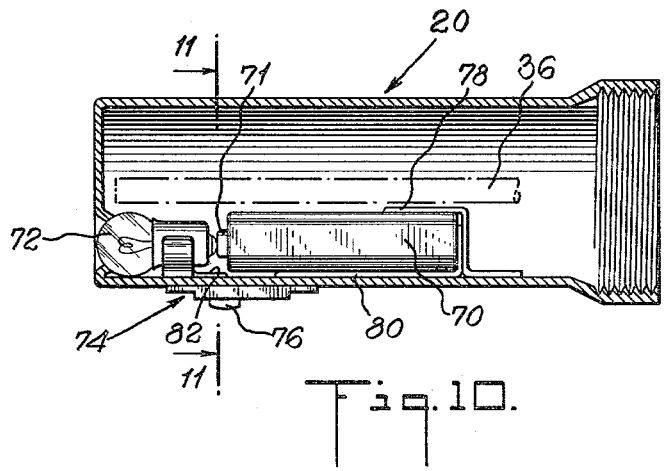
FIGURE 10 is an enlarged, sectional view of the hollow, tubular cover, similar to that of FIGURE 2, showing the battery, bulb and switch mounted thereto.

In the drawings, wherein, for the purpose of illustration, there are shown various embodiments of the parachute release control of the invention, the numeral 10 designates the parachute pack. In FIGURE 1, the sky diver is shown in the usual spread-eagle position which is used in sky diving. The parachute release control 12 is held in the jumper's left hand and is connected to the pack release mechanism by means of the cable contained in conduit 14.

Strap 40 (FIGURE 3) is used to aid the user in holding control 12 and release handle 24 is used to actuate the device. Parachute release control 12 (FIGURE 2) is seen to comprise hollow, tubular, body member 18, dust cover 20 which is joined to body member 18 at threads 22, release handle 24 and spring-loaded piston 32. Handle 24 pivots at 26 so that when it is depressed latch 30 is raised to permit piston 32 to move to its unloaded position under the urging of spring 34. To keep the release mechanism from being actuated accidentally, safety cotter pin 28 is used. This pin is removed just prior to the diver's leaving the plane.

Cable 16 is contained in conduit 14, is run through spring 34 and piston 32, and is anchored at ball and socket fitting 38. Fitting 38 is contained in a hole cut in piston 32 as shown in FIGURE 2. Loading tube 36 is seated against piston 32 by means of its flange which is affixed to ball and socket fitting 38. Thus it can be seen that, in the loaded position, the piston 32 is acted upon by the loading rod 36 due to the pressure of the flange upon the piston. In the unloaded position, the piston 32 pushes against the flange to act on the rod 36 and through it on the cable 16. Conduit receptacle fitting 15 is affixed to body member 18 and is used to secure conduit 14 by means of set screws 17 and thereby prevent any play or looseness at the point of juncture. The release control is loaded by removing dust cover 20 and pressing loading tube 36 into the body member 18 until spring 34 is sufficiently compressed to permit latch 30 to move into place and hold piston 32 in its loaded position. The handle is rendered inoperative by the insertion of safety locking pin 28. This prevents the handle from pivoting freely about pivot 26 and releasing the latch.

The latch 30 is released by removing safety pin 28 and depressing handle 24. When this occurs, piston 32 is urged to its unloaded position under the urging of spring 34, loading tube 36 is moved up into the dust cover and cable 16 is pulled to the left of FIGURE 2. The cable 16 is pulled sufficiently to remove the locking pins from the cones to release the parachute from the pack.

In FIGURE 6 there is illustrated the manner in which cable 16 is connected to the parachute pack. The standard rip cord 50 is contained in conduit 52 which is affixed to mounting 45 by means of screws 46 and 47. Mounting 45 is sewn to the pack by nylon thread 68. Rip cord 50 is actuated by the usual D-ring (not shown) and is connected to pins 56 which are inserted in cones 54 (only one of each shown). The rip cord operation is well-known in the prior art.

The release cable 16 of the invention is connected to the pin and cone of the pack at the same point as the D-ring rip cord so that actuation of either system will release the parachute from the pack. Cable 16 changes its direction in pulley box 42 when it passes over pulley 44 as shown in FIGURE 6. The end of cable 16 is passed under pulley 48 of connector wheel pulley housing 49 and is anchored under mounting screw 46. Pin 56 is inserted through the slot in connector wheel pulley housing 49 and then inserted in cone 54. Actuation of rip cord 50 will pull pin 56 from cone 54 and from the slot in connector wheel pulley housing 49. Actuation of cable 16 will move connector wheel pulley housing 49 up and thereby remove the pins from the cones to release the parachute. Thus it can be seen that when the release handle is depressed (FIGURE 2) so that cable 16 is pulled into the interior of body member 18, the movement of cable 16 causes pins 56 to be removed from cones 54.

In the event that the jumper prefers to use the D-ring release instead of the release mechanism of the invention, he can do so because installation of the present device does not in any way affect the operation of the standard rip cord system.

In some sky diving contests, the jumpers must pass a baton from one to the other in mid-air. Presently, the baton is held in the hand of the first jumper until it is passed. Since these events are standard in many contests and since it is not advisable to have one hand grasping the release mechanism and the other hand grasping the baton, the invention includes a baton which can be mounted on the dust cover. Baton 58 (FIGURES 7 and 8) is provided with spring clips 60 which engage the dust cover 20 in a friction fit. It does not affect the operation of the release mechanism and can easily be removed by the relay jumper. Carrying the baton in this manner allows the right hand to be unencumbered and free to actuate the reserve parachute, if needed.

It is often necessary to take pictures during a jump and many systems have been devised to provide a stable, secure platform for the camera. The invention is readily adaptable to the secure mounting of a camera. Dust cover 21 (FIGURE 9) is similar in size and shape to dust cover 20. It is provided with a mounting bracket 62 in which is threaded a tripod screw 64. Screw 64 is screwed into the threaded opening in camera 66 so that the camera is held securely to the parachute release mechanism 12. Since the parachute release mechanism is affixed to the pack, there is very little possibility that the camera will be dropped during a jump.

Figure 11:
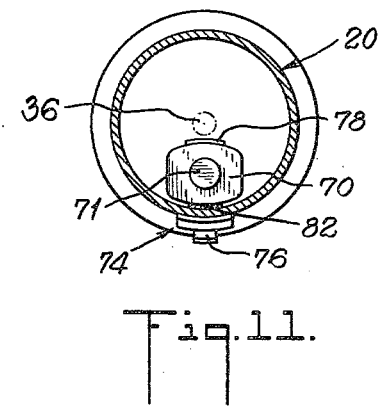
FIGURE 11 is a cross-sectional view taken along the lines 11—11 of FIGURE 10, viewed in the direction of the arrows.

During night jumping, it is often necessary for the parachutist to carry a flashlight. In FIGURES 10 and 11 there is illustrated such a light as a part of the parachute release control of the invention. Switch 74 is mounted on hollow, tubular cover 20. Bulb 72 and battery 70 are mounted in cover 20 so that they do not interfere with the movement of loading rod 36. An opening is provided in the end of cover 20 as shown in FIGURE 10. Bulb 72 is mounted in clip 82 which makes contact with one pole of switch 74 in a manner well-known in the art (details not shown).

Battery 70 is mounted in holder 78 which is affixed to the inside of cover 20. Connection is made from the case of battery 70 to the other pole of switch 74 by means of strap 80 (details of the internal connection are not shown). Terminal 71 of battery 70 makes contact with the tip of bulb 72 as shown in FIGURE 10.

Slide 76 of switch 74 is provided to open and close the electrical circuit. When the switch is closed, the battery and bulb are connected in series through the switch and the bulb lights. When the switch is open, the series circuit is open and the bulb goes out. A transparent lens or similar focusing device may be used to concentrate the light from the bulb into a beam.

While particular embodiments of the invention have been shown and described, it is apparent to those skilled in the art that modifications are possible without departing from the spirit and scope of the invention.

Having thus described the invention, I claim:

1. A parachute release control adapted to be held in the hand during jumping and to actuate the parachute release mechanism on the pack comprising:
   a hollow, tubular, body member;
   a spring-loaded piston mounted within the hollow, tubular, body member adjacent one end thereof;
   a latch adapted to hold the spring-loaded piston in a loaded position against the force of the spring;
   means affixed to the hollow, tubular, body member for releasing the latch to permit the spring-loaded piston to assume its unloaded position;
   a loading tube for moving the spring-loaded piston to its loaded position mounted in the hollow, tubular body member and movable into and out of the hollow, tubular body member such that the loading tube is largely within the hollow, tubular body member when the spring-loaded piston is in its loaded position and largely outside the hollow, tubular body member when the spring-loaded piston is in its unloaded position; and
   a cable affixed at one end to the means for loading the spring-loaded piston and at the other end to the parachute release mechanism on the pack such that the parachute release mechanism on the pack is actuated when the spring-loaded piston is moved to its unloaded position.

2. A parachute release control as described in claim 1 including a hollow, tubular, cover adapted to mate with the hollow, tubular, body member and to enclose the loading tube when the piston is in its unloaded position.

3. A parachute release control as described in claim 2 including a hollow baton adapted to slip over the hollow, tubular, cover.

4. A parachute release control as described in claim 2 including a camera tripod, socket bolt affixed to the hollow, tubular, cover to mount a camera thereon.

5. A parachute release control as described in claim 2 including a battery and a bulb mounted in the hollow, tubular, cover; a switch mounted on the hollow, tubular, cover so as to be operable when the hollow, tubular, cover is mated to the hollow, tubular, body member; the battery, bulb and switch being mounted in series such that the parachutist may turn the bulb on and off freely during descent.

References Cited by the Examiner

UNITED STATES PATENTS

| 2,172,294 | 9/39 | Riddell | 74—502 |
| 2,470,457 | 5/49 | Bancora | 244—150 |
| 2,478,138 | 8/49 | Tobias | 244—150 |

FOREIGN PATENTS 1,178,079  12/58  France.

OTHER REFERENCES

Aviation Week, Nov. 9, 1956, page 99.

FERGUS S. MIDDLETON, *Primary Examiner.*